United States Patent [19]
Susicki

[11] Patent Number: 5,782,400
[45] Date of Patent: Jul. 21, 1998

[54] SUBSTRATE CARRIER FOR A SOLDERING MACHINE

[75] Inventor: John Susicki, Des Plaines, Ill.

[73] Assignee: Susco Manufacturing Co., Inc., Des Plaines, Ill.

[21] Appl. No.: 673,377

[22] Filed: Jun. 28, 1996

[51] Int. Cl.⁶ .................................................. B23K 37/04
[52] U.S. Cl. .............................. 228/49.5; 269/71; 269/79
[58] Field of Search ............................ 228/49.5; 269/71, 269/79, 61

[56] References Cited

U.S. PATENT DOCUMENTS

| | | |
|---|---|---|
| 2,870,532 | 1/1959 | Young. |
| 3,056,371 | 10/1962 | Frank. |
| 3,059,604 | 11/1962 | Brandys. |
| 3,499,220 | 3/1970 | Hintz et al.. |
| 3,713,876 | 1/1973 | Lavric. |
| 3,828,419 | 8/1974 | Wanner. |
| 3,921,888 | 11/1975 | Elliott et al.. |
| 3,989,180 | 11/1976 | Tardoskegyi. |
| 4,465,219 | 8/1984 | Kondo. |
| 4,510,980 | 4/1985 | Bartlett et al. ............................ 269/61 |
| 4,705,447 | 11/1987 | Smith ........................................ 269/71 |
| 4,723,769 | 2/1988 | Nilsson ..................................... 269/79 |
| 4,803,308 | 2/1989 | Taguchi. |
| 4,807,794 | 2/1989 | Hess. |
| 4,848,642 | 7/1989 | Kondo. |
| 4,848,644 | 7/1989 | Cunningham. |
| 4,869,418 | 9/1989 | Simpson. |
| 5,176,312 | 1/1993 | Lowenthal. |
| 5,611,480 | 3/1997 | Ciniglio et al. ......................... 228/180.1 |

FOREIGN PATENT DOCUMENTS

| | | |
|---|---|---|
| 0234850 | 9/1987 | European Pat. Off.. |
| 0481710 | 4/1992 | European Pat. Off.. |
| 51-9015 | 1/1976 | Japan. |
| 51-27845 | 3/1976 | Japan ................................... 228/49.5 |
| 62-76541 | 1/1987 | Japan. |
| 1532214 | 12/1989 | U.S.S.R. ............................... 228/49.5 |
| 2265325 | 9/1993 | United Kingdom. |

OTHER PUBLICATIONS

Statement Regarding Prior Sale (Mar. 1995) of a Device Similar to the Claimed Device.

*Primary Examiner*—Gary F. Paumen
*Assistant Examiner*—Jeffrey T. Knapp
*Attorney, Agent, or Firm*—Wood, Phillips, VanSanten, Clark & Mortimer

[57] ABSTRACT

A substrate carrier for use with a soldering machine has a base, a slide that moves in a horizontal path relative to the base, a table that moves in a vertical path relative to the base, and a frame that carries a substrate at various angles to the base during this soldering process. In another aspect of the present invention, the angular position of the table relative to the base is also changeable.

18 Claims, 2 Drawing Sheets

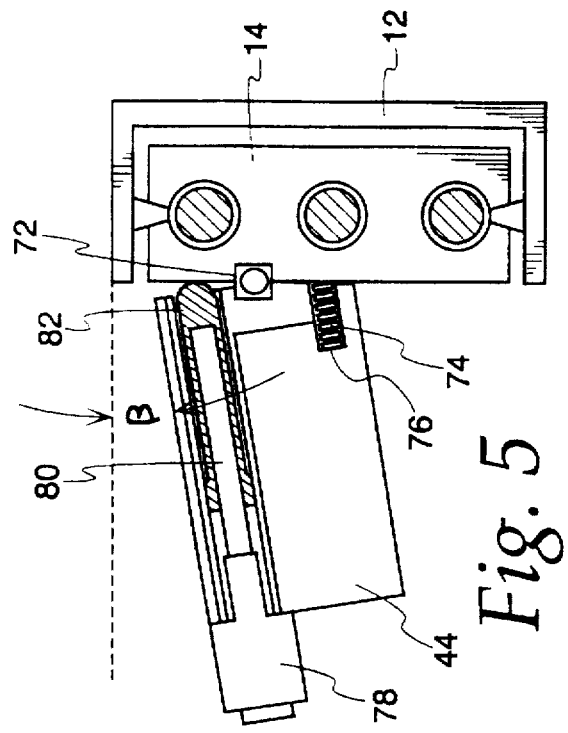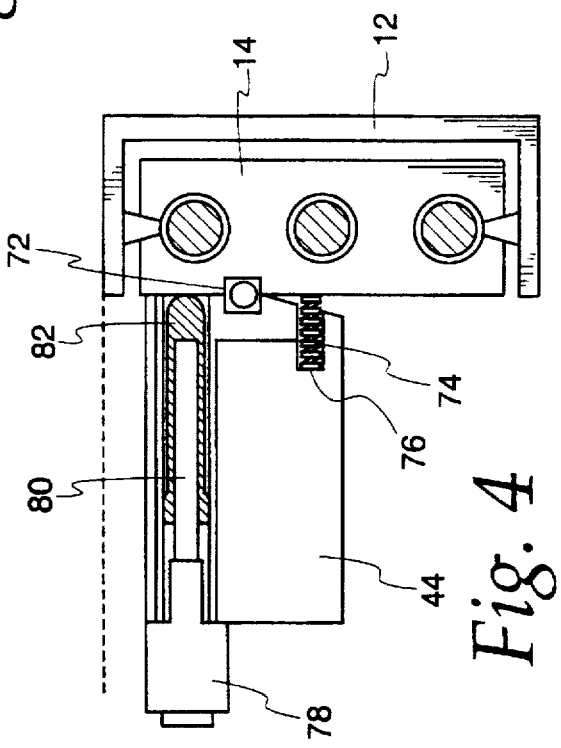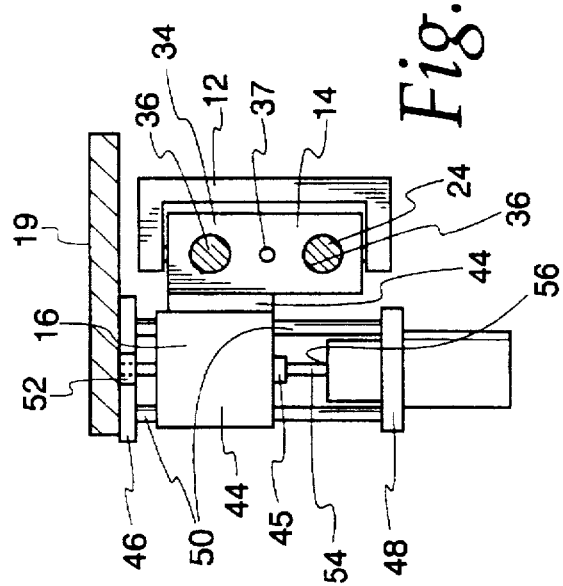

5,782,400

SUBSTRATE CARRIER FOR A SOLDERING MACHINE

BACKGROUND OF THE INVENTION

1. Technical Field

The present invention is directed toward a substrate carrier for use with a soldering machine, and more particularly toward a printed circuit board carrier that works with the soldering machine to prevent the formation of solder bridges and icicles on a printed circuit board.

2. Background Art

Current electronic components have much of their wiring assembled on printed circuit boards. An insulating substance forms the "board" portion of a printed circuit, or PC board, into which circuits are embedded. Leads of electrical components are inserted into the PC board to connect with conductive pathways printed in the board. Solder is applied to the PC board at these lead-conductive pathway junctions to insure a reliable circuit with a permanent connection.

Solder is applied to the PC board using touch soldering, dip soldering or combined touch-dip soldering techniques.

In modem production of PC boards the electrical components have gotten smaller and are more densely packed onto the PC board. These factors make imperfections in the soldering process less tolerable. During the soldering step, a number of problems can arise. Icicles are formed when solder drips from soldered portions of the PC board and solidifies. In some cases these icicles will extend across two or more pins to form a bridge which can cause a short in the circuit board. Removing icicles and bridges may require additional steps which can add to the cost of producing the circuit board assembly.

It is known that icicle and bridge formation can be discouraged when the PC board travels through the soldering system at an angle to the horizon of the solder path. Prior art systems for producing icicle and bridge-free soldered PC boards can have drawbacks which make the systems undesirable. Examples of these drawbacks include requiring two solder reservoirs which increases production costs and space required for solder application. Another drawback is angling the entire PC board conveyor system over the solder reservoir. Such angling can limit the versatility of the soldering machine. Also, single angled plane approach may not satisfactorily remove the icicles and bridges from a complex PC board.

Another approach to solving this problem has been to support a PC board on ramps and rails that allow the PC board to sit at a particular angle in relationship to the solder bath. One problem with this approach is that several mechanical adjustments must be made to effect a change in the PC board position. This can slow the process to an unacceptable pace. Also, such an arrangement can provide a limited range of angles, which may also limit its usefulness.

For the foregoing reasons, it is apparent that there is a need for a PC board carrier for use with a soldering machine that offers control of the PC board during the soldering process, is simple and compact, yet is not limited to a small range of angles.

SUMMARY OF THE INVENTION

The present invention is directed to a substrate carrier for use with a soldering machine that satisfies these needs. A substrate carrier having features of the present invention comprises a base, a slide that moves in a horizontal path relative to the base, a table that moves in a vertical path relative to the slide, and a frame that moves relative to the table between first and second positions so that a substrate held by the frame has different angular relationships with the base in the first and second positions.

The base has at least one guiding rod that supports the slide as the slide moves in a horizontal path relative to the base. The base further has a rotatable screw element cooperating with the slide to effect horizontal movement of the slide.

The table has a rotatable screw element cooperating with the base to move the table along a vertical path with respect to the base. The frame has a movable angling rod which cooperates between the frame and the base to move the frame between the first and second positions. The angling rod is driven by means of a rotatable screw element.

In another aspect of the invention, the table can change angular positions relative to the base by means of a rotatable screw element cooperating between the table and the base.

In a further aspect of the invention the substrate carrier is provided in conjunction with a soldering machine.

DESCRIPTION OF THE FIGURES

FIG. 3 is a cross-sectional view of the substrate carrier showing the adjustable table block of the preferred embodiment in relation to the slide mechanism along line 2—2 of FIG. 2;

FIG. 4 is a cross-sectional view of the alternate embodiment of the invention showing the alternate table block in a first position along the slide; and FIG. 5 is a cross-sectional view of the alternate embodiment of the invention showing the alternate table block in a second position along the slide.

DESCRIPTION OF THE PREFERRED EMBODIMENT

Figure 1:
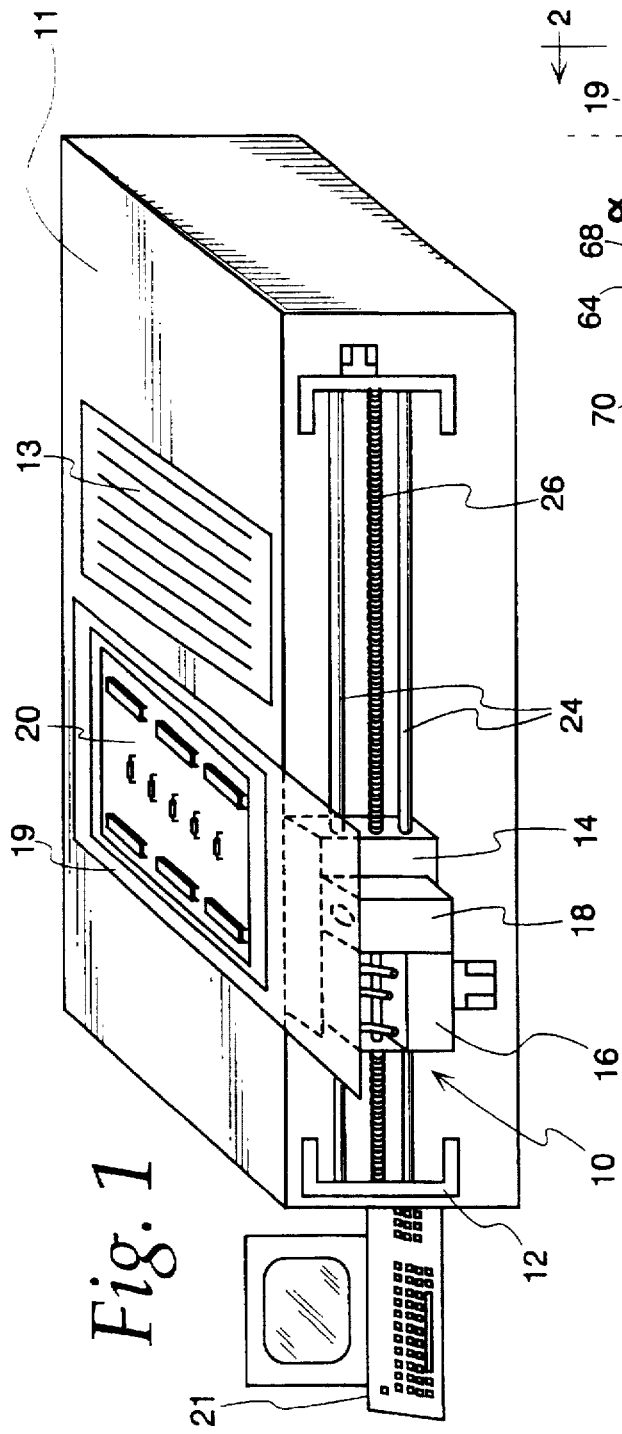
FIG. 1 is a perspective view of the preferred embodiment having a slide mechanism, table mechanism and angling mechanism mounted to a soldering machine.

Modern PC boards are soldered by soldering machines. FIG. 1 shows a PC board carrier 10 mounted to a soldering machine 11. The soldering process includes the steps of placing a substrate in a proper carrier 10. The substrate is then transported to a flux station where flux is applied. The board is then transported to a pre-heating station and then moved to a soldering station 13 where it is soldered. The board is placed over a nozzle plate on top of the solder bath. The solder is applied to the pins of the substrate through the nozzle. During this step the substrate is carried through the soldering station at a particular rate of speed, at a particular height, and at a particular angle to the horizon. The preferred values for the speed, height and angle of the substrate during soldering varies with different substrates to be soldered. After a substrate is exposed to the soldering station for a given amount of time, the substrate is transported to an unload area.

The typical soldering machine has a solder bath 13, a soldering pathway that runs through the solder bath, and loading and unloading points on the pathway. It is possible to remove icicles and bridges from newly soldered PC boards by angling the PC board to the solder bath during the soldering process. The preferred embodiment of the invention is a substrate carrier that provides varying horizontal, vertical and angular movement of the substrate with respect to the solder bath in order to prevent the formation of icicles and bridges on the substrate.

The substrate carrier 10 has a base 12 mountable to a soldering machine 11 shown in FIG. 1. The base 12 supports a slide mechanism 14 which carries a PC board along the above-discussed pathway. Connected to the slide 14 is a table mechanism 16. The table mechanism 16 determines the distance between the PC board and the solder bath as the slide carries the PC board along the pathway. The table mechanism 16 further has an angling mechanism 18 which determines the angular relationship between the PC board and the solder bath during the soldering process. On the angling mechanism 18 is a frame 19 having a support surface which carries a substrate 20 to be soldered. The desired horizontal, vertical and angular movement is achieved by inputting desired variables into an input station 21, which transmits the information to the slide, table, and angling mechanisms.

Figure 2:
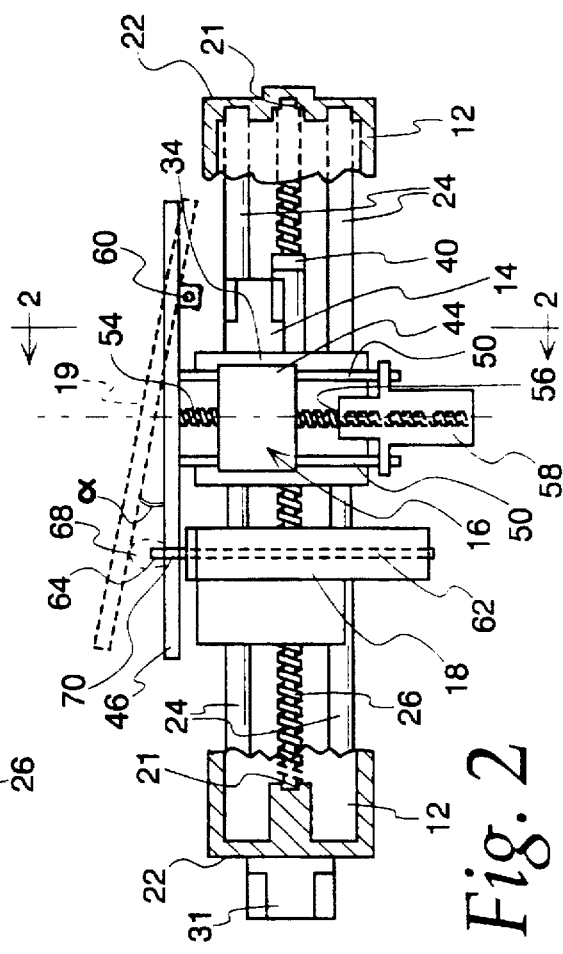
FIG. 2 is a front elevation of the preferred embodiment of the substrate carrier.

The base 12 is made of metal and attaches to the soldering machine 13 in a manner well known to those skilled in the art. FIG. 2 shows the base 12 with two ends 22 supporting a pair of horizontal guide rods 24. These guide rods in turn support the slide mechanism. A screw 26 extends parallel to and between the guide rods and is held by bearings 21 in the base ends 22 that allow the screw 26 to rotate. A coupling 30 is driven by a motor 31 and communicates with one bearing 21 to effect rotation of the screw 26.

The slide mechanism 14 includes a slide 34 which is a rectangular metal block, as seen in FIG. 2. The slide 34 has two throughbores 36 and a screw hole 37 extending therethrough. The horizontal guide rods 24 extend through the throughbores 36 to guide and support the slide 34 for horizontal movement along the soldering pathway between loading and unloading stations. Ball bearings (not shown) are disposed within the throughbores 36 to facilitate the slide's 34 horizontal movement along the rods 24. A stationery screw nut 40 is positioned at the screw hole 37 such that the screw 26 is threaded therethrough. When the screw 26 turns, the stationery screw nut 40 and slide 34 travel the length of the screw 26. Clockwise rotation of the screw 26 causes the slide 34 to move in a first direction (for example, toward the solder bath 13) while counterclockwise rotation of the screw 26 causes slide 34 movement in the opposite direction.

The table mechanism 16 is mounted on the slide mechanism 14, and provides movement in a vertical path relative to the base 12. The table mechanism 16 is secured to the slide 34 by means of a table block 44. The table block 44 is a rectangular metal block having five vertical throughbores therethrough. The table mechanism 16 mounts to the table block 44 as follows. The table top 46 extends in a horizontal plane above the table block 44 and is connected to a lower table plate 48 by four vertically extending rods 50. The rods 50 extend through the table block 44 and are mounted on each corner of the lower table plate 48 and to four points in a central area of the table top 46. The table top 46 has a greater area than the lower table plate 48. The table top 46 further has a bearing 52 on its underside that receives and allows free rotary motion of a vertical screw 54. The screw 54 extends through a throughbore and a stationery nut 45 in the table block 44 to intersect a coupling 56 on the lower table plate 48. A motor 58 connects to the coupling 56 in order to drive the vertical screw 54 in a rotary movement. As the motor 58 turns the vertical screw 54, the vertical stationary nut 45 and table block 44 maintain their vertical position while the top and lower plates 46, 48, vertical rods 50, and screw 54 move up or down, depending on the rotational direction of the screw 54.

The angling mechanism 18 is connected to the table top 46 to allow the frame 19 to change its angular relationship to the table top 46. One end of the frame is attached to the table top 46 by a hinge 60. Remote from the hinge 60 and mounted to the underside of the table 46 is the angling mechanism 18. The angling mechanism 18 consists of a stepping motor 62, an angling screw 64 having one end connected to the motor 62 and the other end capped with a nut and ball tipped angling rod 68. As the motor 62 turns the angling screw 64, the ball tipped angling rod 68 travels in a vertical manner relative to the base 12. When the angling screw 64 turns to push the ball tipped angling rod 68 through a throughbore 70 in the tabletop 46, the nut and ball tipped rod lifts one end of the frame 19 to a desired angle α. FIG. 2 shows the frame 19 in a first position. FIG. 3 shows frame 19 in its second position.

A description of how the carrier works follows. A substrate 20 to be soldered is placed upon the frame 19. The operator determines the speed, angling and depth of the soldering process for that particular substrate and inputs the desired variables to an input station, which in turn communicates the particular sequence of orders to the carrier and the slider table and angling motion. The soldering process begins as the slide mechanism 14 brings the PC board 20 closer to the soldering station. The table mechanism 16 will adjust vertically to carry the PC board 20 through the soldering bath at a desired height. The angling mechanism 18 adjusts the angling screw 64 and ball tip angling rod 68 to lift the frame 19 to a desired angle which prevents the formation of bridges and icicles. The relevant angle is shown in FIG. 2 as that between the substrate 20 and the table top plate 46.

In another version of the invention, the angular position of the table block 44 relative to the base 12 can vary. This is achieved by modifying the shape of the table block 44. The table block 44, as shown in FIGS. 4–5, is hinged to the slide 34 by a horizontally extending hinge 72 located midway between the upper and lower edges of the table block 44. Below the hinge 72 a wedge of the table block 44 is cut away to allow table block 44 to pivot downward along the hinge 72 relative to the slide 14. The table block 44 remains at a 90° angle to the slide 34 due to the bias of a table spring 74 disposed in a spring recess 76 in the table block 44. The table spring 74 extends between the slide 14 and the table block 44. The table block 44 can be angled down in a controlled manner by a table angling means, which consists of a table angling motor 78 that rotates a table angling screw 80 causing a table angling ball-tip rod 82 to extend against the slide 14. The table angling ball tipped rod 82 extends from the table block above the hinge, while the table spring 74 is positioned below the hinge 72. As the table angling ball-tip rod 82 extends from the table block 44, the table block 44 pivots along the table hinge 72 against the bias of the table spring 74, causing the table block to form a desired angle β with the base 12, as shown in FIG. 5.

From the foregoing, it can be seen that the PC board carrier for use with a soldering machine offers an efficient way to prevent icicle and bridge formation during the soldering process. The preferred embodiment controls the PC board during the soldering process, is not limited to a small range of angles, and is simple to manufacture and use.

I claim:

1. A substrate carrier for use with a soldering machine, said substrate carrier comprising:

a base;

a slide mounted to the base for movement relative to the base in a horizontal path;

means for moving the slide in the horizontal path relative to the base;

a table mounted on the slide for movement relative to the slide in a vertical path;

means for moving the table in the vertical path relative to the slide;

means for changing the angular position of at least a part of said table relative to said base;

a frame having a support surface for carrying a substrate to be soldered in an operative position and mounted to the table for movement relative to the table between a first position and a second position so that a substrate carried on the frame support surface in the operative position has a different angular relationship to the base with the frame in the first and second positions; and means for moving the frame between the first and second positions, wherein one of the first and second positions is at an angular position that prevents formation of solder bridges and icicles on the substrate.

2. The substrate carrier of claim 1 wherein the base further comprises:

at least one slide supporting guide rod to guide movement of the slide relative to the base.

3. The substrate carrier of claim 1 wherein said means for moving said slide comprises:

a screw element cooperating between the slide and base that is rotatable to effect movement of the slide.

4. The substrate carrier of claim 1 wherein said means for moving said table comprises a screw element cooperating between the table and base and rotatable to effect movement of said table.

5. The substrate carrier of claim 1 in combination with a soldering machine.

6. The substrate carrier of claim 1 wherein the means for angling said table comprises a rotatable screw element cooperating between said table and said base to alter the angular relationship of said table to said base.

7. The substrate carrier of claim 1 wherein the means for angling said table comprises a rotatable screw element cooperating between said table and said base.

8. The substrate carrier of claim 1 wherein the means for pivoting said frame comprises a movable angling rod cooperating between said frame and said base.

9. The substrate carrier of claim 8 wherein said means for pivoting said frame comprises a rotatable screw element cooperating between said frame and base to lift said frame to a desired angle to said base.

10. An apparatus for carrying a substrate to be soldered, said apparatus comprising:

a base;

a slide mounted on said base for movement relative to said base in a horizontal path;

means for moving said slide in said horizontal path relative to said base;

at least one rod on said slide;

a table through which said at least one rod extends, said table slidably mounted on said at least one rod for guided movement relative to said slide in a vertical path;

means for moving said table in said vertical path relative to said slide;

means for changing the angular position of said table relative to said base;

a frame having a substrate carrier portion, said frame connected to said table for movement relative to said table between a first position and a second position so that a substrate to be soldered carried on said substrate carrier portion in the operative position has a different angular relationship to the base with the frame in the first and second positions; and means for moving the frame between the first and second positions, wherein one of the first and second positions is at an angular position that prevents formation of solder bridges and icicles on the substrate.

11. The apparatus of claim 10 wherein the means for moving said slide comprises a rotating screw element cooperating between said slide and said base.

12. The apparatus of claim 10 further comprising:

at least one guide rod cooperating between said base and said slide to guide movement of the slide relative to the base.

13. The apparatus of claim 10 wherein said means for moving said table comprises a rotatable screw element cooperating between said table and said frame.

14. The apparatus of claim 10 wherein the means for pivoting said frame comprises a movable angling rod cooperating between said frame and said base.

15. The apparatus of claim 10 wherein the means for pivoting said frame comprises a rotatable screw element cooperating between the frame and base.

16. The apparatus of claim 10 further in combination with a soldering machine.

17. The apparatus of claim 10 wherein said frame is hingedly mounted to said table.

18. The apparatus of claim 10 wherein said table is hingedly mounted to said slide.

* * * * *